M. S. YOUNG.
PUSH BUTTON FOR STEERING POSTS.
APPLICATION FILED SEPT. 19, 1916.
1,247,357.
Patented Nov. 20, 1917.
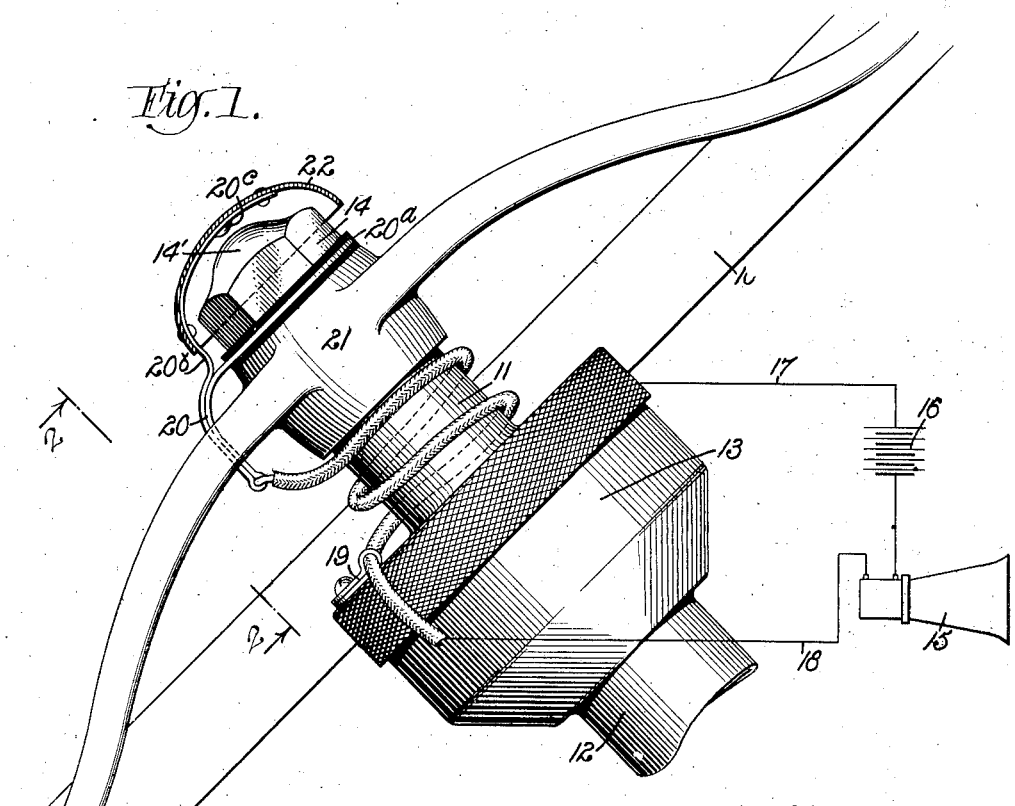
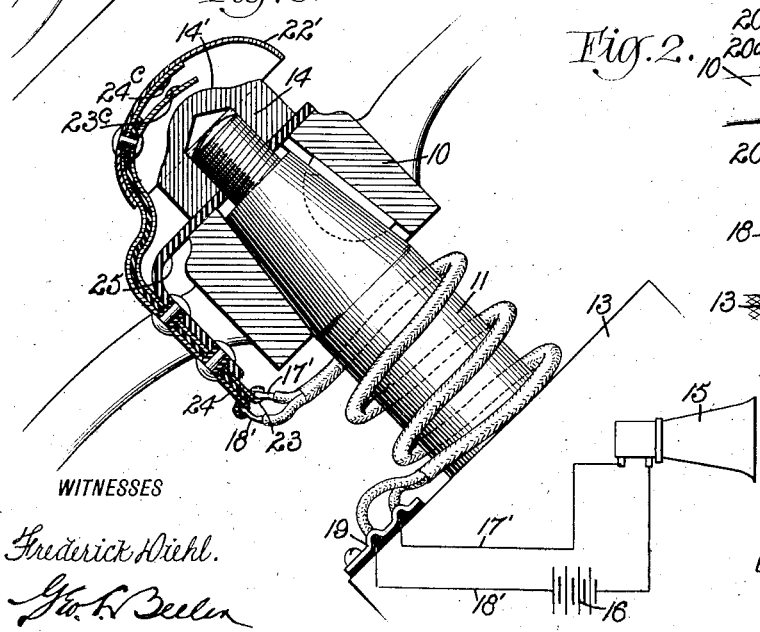
WITNESSES
Frederick Diehl.
Geo. F. Beeler
INVENTOR
M. S. Young
BY
ATTORNEYS

UNITED STATES PATENT OFFICE.

MILLARD SOUTHWORTH YOUNG, OF DETROIT, MICHIGAN.

PUSH-BUTTON FOR STEERING-POSTS.

1,247,357.  Specification of Letters Patent.  Patented Nov. 20, 1917.

Application filed September 19, 1916. Serial No. 120,941.

*To all whom it may concern:*

Be it known that I, MILLARD S. YOUNG, a citizen of the United States, and a resident of Detroit, in the county of Wayne and State of Michigan, have invented a new and Improved Push-Button for Steering-Posts, of which the following is a full, clear, and exact description.

This invention relates to signaling or alarm devices adapted especially for automobile or similar practice.

Among the objects of the invention is to provide an improved push button attachment for the upper end or head of a steering post, where it will be within easy and convenient reach of the operator having command of the steering wheel or other mechanism.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a side elevation of the head of a steering post and as much of the improvement applied thereto as is necessary to give an understanding of its structure and operation;

Fig. 2 is a partial view of the same but from a different angle as viewed from the line 2—2 of Fig. 1; and Fig. 3 is a vertical sectional view showing a slight modification of means for applying the device to the steering post.

Referring now more particularly to the drawings in which I show my improvement as adapted especially for the sounding of a horn, I show at 10 a steering wheel secured upon a steering post 11 within a standard 12. Said standard is provided with a cap or stuffing box 13 of any suitable construction. The wheel is held upon the post by means of a binding nut 14 having a rounded upper face 14′.

At 15 I indicate diagrammatically a signal in circuit with a battery 16, one wire 17 from which is grounded upon the machine at any convenient place, while the other wire 18 is insulated from the machine but anchored at 19 to the upper portion of the cap 13. The wire 18 is thence coiled loosely about the steering post a number of times and electrically connected to a yoke 20, one wing 20ª of which is clamped between insulating washers 21 held in place between the nut 14 and the wheel. The other wing 20ᵇ of the yoke constitutes a spring bowed upwardly over the rounded face of the nut and carries a hollow convex cap 22 fitted loosely over said nut and spaced normally therefrom by action of the spring 20ᵇ. The spring or a portion of it constitutes an electrical terminal for the wire 18 and to make its contact more effective may be provided with a lug 20ᶜ adapted to contact with the rounded face of the nut when pressure is applied to the convex cap 22, thereby completing the circuit from the battery through the wires and the steering post.

In the modified form shown in Fig. 3, the signal 15 is in circuit with the battery 16, but both of the wires 17′ and 18′ are carried together to the contact devices.

These contact devices comprise two metallic contacts 23 and 24 insulated from each other and from the other parts of the machine and have the ends of the wires 17′ and 18′ fixed thereto. These contacts are carried by a bracket 25 anchored between the nut 14 and the hub of the wheel, substantially like the means for anchoring the yoke 20. Both of the members 23 and 24 may be of spring material and extend substantially parallel to each other throughout their length, except at the free end where they are spaced slightly, but adapted to be brought into electrical connection at the studs 23ᶜ and 24ᶜ. A convex cap 22′ of a form similar to that described above is secured to the spring contact members 23 and 24 adjacent, but slightly spaced from the nut 14. In this form of the invention when pressure is applied to the cap 22′ forcing it down upon the nut, the contact points 23ᶜ and 24ᶜ will be brought into engagement with each other completing the circuit through the battery wires 17′ and 18′ and contact strips 23 and 24. In each of the forms shown, the contact devices include the convex cap extending loosely over the clamping nut locking the steering wheel to the steering post, and which when forced down upon the nut or toward the end of the post will cause the circuit through the battery to be completed.

I claim:

1. The herein described circuit closing means adapted for use in connection with a steering post, a wheel, and a nut clamping the wheel to the post, said means comprising a hollow convex cap spaced over the nut, a resilient support for the cap, means clamped beneath the nut to hold the support, an electric circuit, and means to cause the closing of the circuit upon depressing the cap toward the nut.

2. The combination with a steering post, a steering wheel and a clamping nut to secure the wheel to the post, of electric circuit closing devices including a wire extending along the post, supporting means for the end of said wire clamped between the nut and the wheel and insulated therefrom, and a contact member connected to the end of said wire movable toward said nut to cause the completion of the circuit, substantially as set forth.

MILLARD SOUUHWORTH YOUNG.

Witnesses:
C. W. HESLIP,
MARSHALL T. BODEN.